United States Patent [19]

Nagao et al.

[11] Patent Number: 4,620,519

[45] Date of Patent: Nov. 4, 1986

[54] FUEL INJECTION SYSTEM FOR INTERNAL COMBUSTION ENGINE

[75] Inventors: Akihito Nagao; Sadashichi Yoshioka; Hiroyuki Oda; Takashige Tokushima, all of Hiroshima, Japan

[73] Assignee: Mazda Motor Corporation, Japan

[21] Appl. No.: 678,587

[22] Filed: Dec. 5, 1984

[30] Foreign Application Priority Data

Dec. 7, 1983 [JP] Japan ............................... 58-232167

[51] Int. Cl.$^4$ ........................................... F02M 39/00
[52] U.S. Cl. ..................................... 123/492; 123/419
[58] Field of Search ............... 123/492, 419, 357, 358, 123/359

[56] References Cited

U.S. PATENT DOCUMENTS

| | | | |
|---|---|---|---|
| 4,077,364 | 3/1978 | Aoki | 123/492 |
| 4,184,461 | 1/1980 | Leung | 123/492 |
| 4,214,306 | 7/1980 | Kobayashi | 123/492 |
| 4,357,662 | 11/1982 | Shira | 123/419 |
| 4,434,768 | 3/1984 | Ninomiya | 123/492 |
| 4,458,651 | 7/1984 | Inoue | 123/492 |
| 4,471,743 | 9/1984 | Watanabe | 123/492 |

FOREIGN PATENT DOCUMENTS

| | | | |
|---|---|---|---|
| 55-112829 | 9/1980 | Japan | 123/492 |
| 56-148636 | 11/1981 | Japan | 123/492 |

Primary Examiner—Carl Stuart Miller
Attorney, Agent, or Firm—Gerald J. Ferguson, Jr.; James E. Bryan; Michael P. Hoffman

[57] ABSTRACT

An internal combustion engine is provided with a separately formed intake passage for each cylinder. Each intake passage is provided with a fuel injection valve. The fuel injection valve is controlled to inject fuel in the latter half of the intake stroke of the corresponding cylinder. The amount of fuel injected from the fuel injection valve is increased upon acceleration of the engine by an amount which is separately determined for each cylinder and is generally reduced in the order of the firing order.

9 Claims, 10 Drawing Figures

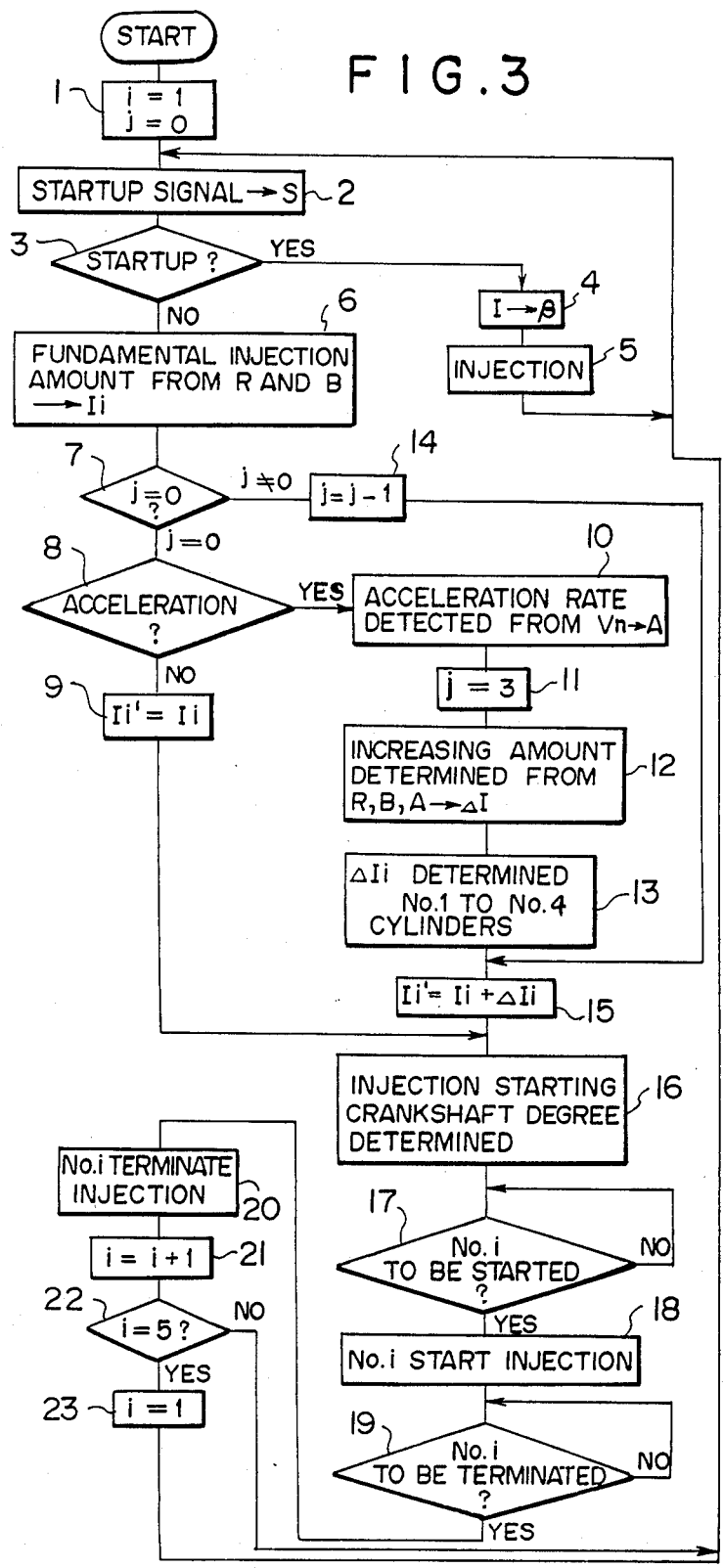
FIG. 3
FIG. 3A
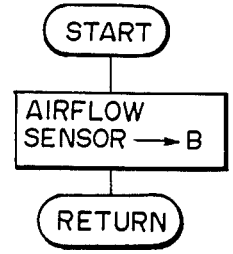
FIG. 3B
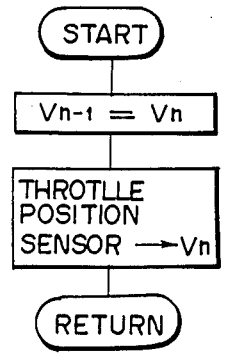
FIG. 3C
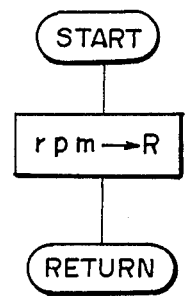

FUEL INJECTION SYSTEM FOR INTERNAL COMBUSTION ENGINE

BACKGROUND OF THE INVENTION

1. Field of the Invention

This invention relates to a fuel injection system for an internal combustion engine.

2. Description of the Prior Art

As is disclosed in Japanese Unexamined Patent Publications Nos. 55(1980)-112829 and 56(1981)-148636, there has been known a fuel injection system in which a fuel injection valve is provided in each of the intake pipes connected to the respective cylinders and fuel is injected from the fuel injection valve in synchronization with the intake stroke of the corresponding cylinder. The fuel injection system of this type is advantageous in that an optimal amount of fuel can be fed to each cylinder even if there is a variation in characteristics among the cylinders and accordingly the engine can be operated efficiently. Particularly in the system disclosed in the latter Japanese Unexamined Patent Publication, so-called stratified charge is used. That is, fuel is injected in the latter half of the intake stroke so that the fuel and air are not mixed uniformly in the cylinder but are in layers, the air-fuel mixture in the upper portion of the cylinder (where a spark plug is positioned) being rich and that in the lower portion of the cylinder being lean. Though the air-fuel ratio of the mixture surrounding the spark plug must be sufficient to be ignited by the spark plug, the lower layer may be solely of air or of very lean mixture. Therefore, the air-fuel ratio of the overall mixture may be very lean, whereby the specific fuel consumption can be substantially reduced and at the same time, unburned components such as CO and NOx can be reduced.

Because, it is difficult to obtain satisfactory response of the engine when the engine is to be accelerated due to delay in detection by the detecting system, the amount of fuel fed to each cylinder has been increased during acceleration of the engine. In order to apply this system to the fuel injection systems described above in which fuel is injected separately for each cylinder, the manner of increasing the amount of fuel is very important for maintaining high operating efficiency of the engine. Particularly in the latter fuel injection system in which stratified charge is accomplished, if the manner of increasing fuel is not proper, the air-fuel ratio deviates from a target value so that the air-fuel mixture becomes too rich and/or the engine stalls, and thus the advantage of the system that the air-fuel mixture fed to each cylinder may be lean is lost.

SUMMARY OF THE INVENTION

In view of the foregoing observations and description, the primary object of the present invention is to provide a fuel injection system for an internal combustion engine in which fuel is injected for each cylinder and the amount of fuel fed to each cylinder can be increased in an optimal manner when the engine is to be accelerated.

The following has been found with respect to delay in detection by the detecting system. In FIG. 1-$a$ is shown, the change with time of the throttle opening degree TV, and in FIG. 1-$b$ is shown the change with time of the angular velocity $\omega$ of the throttle valve. The change with time of the amount of intake air Q and that of the output of the airflow sensor Q' are respectively represented by the solid line and the dotted line in FIG. 1-$c$. During acceleration, the amount of fuel to be injected is generally controlled in response to change in the output of the airflow sensor. However, even during acceleration in which the change with time of the angular velocity of the throttle valve is constant as shown in FIGS. 1-$a$ and 1-$b$, the change in the output of the airflow sensor Q' is delayed with respect to the change of the amount of intake air Q and accordingly the amount of fuel to be injected cannot be increased following the increase in the amount of intake air, which results in poor response in acceleration. The response in acceleration can be improved by increasing the amount of fuel injected by an amount corresponding to the difference between the output of the airflow sensor Q' and the actual amount of intake air Q. However, the difference between the output of the airflow sensor Q' and the actual amount of intake air becomes maximum in the early stage of acceleration and declines toward the end of the acceleration as can be understood from FIG. 1-$c$. Therefore the amounts of fuel $\Delta Q$ by which the amount of fuel to be fed to the cylinders is to be increased must be reduced in the order of the firing order as shown in FIG. 1-$d$.

Strictly speaking, the difference between the output of the airflow sensor and the actual amount of intake air is small in the earliest stage of acceleration as can be understood from FIG. 1-$c$. Therefore, if necessary, the value $\Delta Q$ may be first increased in the order of the firing order.

That is, in accordance with the present invention, there is provided a fuel injection system in which each cylinder is provided with a separately formed intake passage having a fuel injection valve and fuel is fed to each cylinder from the fuel injection valve of the corresponding intake passage, the amount of fuel injected into each cylinder being increased during acceleration of the engine by an amount which is separately determined for each cylinder.

BRIEF DESCRIPTION OF THE DRAWINGS

FIGS. 3, 3A, 3B and 3C show flow charts showing the operation of the CPU employed in the engine of FIG. 3.

DESCRIPTION OF THE PREFERRED EMBODIMENT

Figure 2:
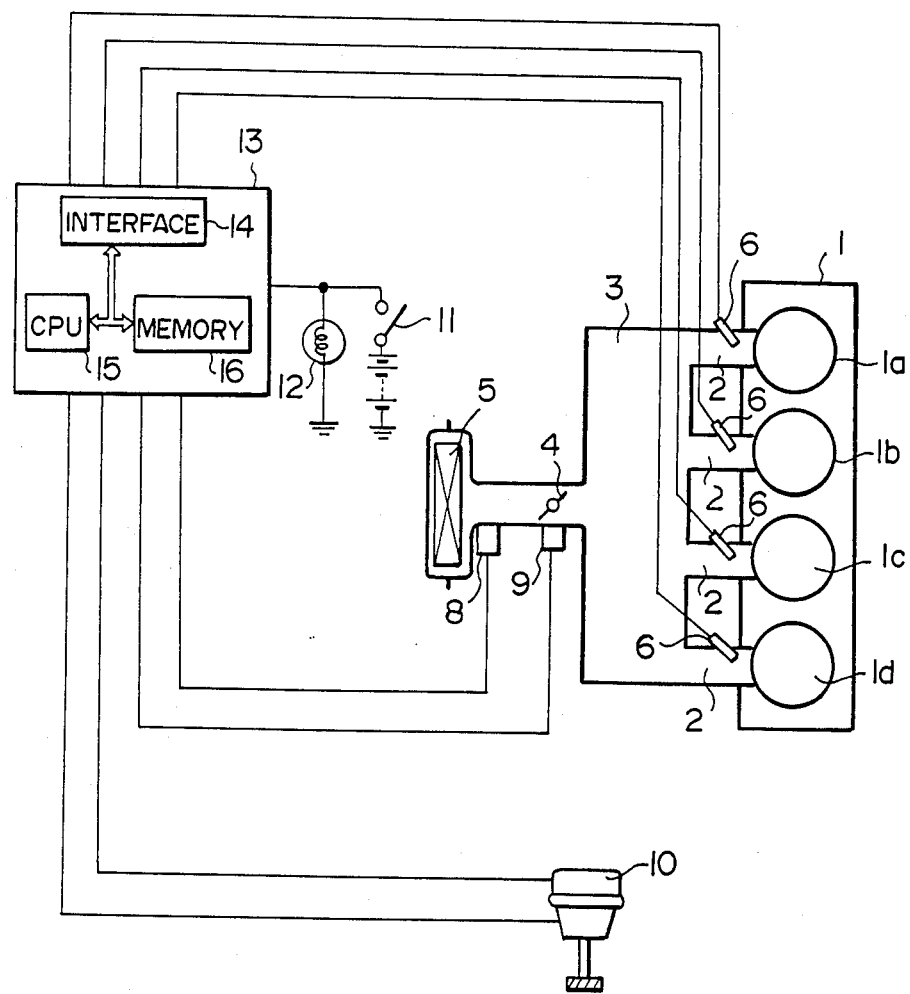
FIG. 2 is a schematic view of an internal combustion engine employing a fuel injection system in accordance with an embodimemt of the present invention.

In FIG. 2, an internal combustion engine 1 employing a fuel injection system in accordance with an embodiment of the present invention has first to fourth cylinders 1$a$ to 1$d$. The four cylinders 1$a$ to 1$d$ are separately communicated with a surge tank 3 by way of respective intake pipes 2 forming a part of an intake passage of the engine 1. A throttle valve 4 is provided in the intake passage upstream of the surge tank 3, and an air cleaner 5 is disposed in the upstream end of the intake passage. Each intake passage 2 is provided with a fuel injection valve 6 near the intake port of the corresponding cylinder 6. Each fuel injection valve 6 is connected to a fuel tank (not shown) by way of a fuel-pressure regulator and a fuel pressure is imparted to the fuel injection valve 6 by way of the regulator so that the pressure difference between the fuel injection valve 6 and the intake pipe 2 is kept constant.

The engine 1 is further provided with an airflow sensor (e.g., for detecting the intake pressure) 8, a throttle position sensor 9 for detecting the opening degree of the throttle valve 4, a crankshaft angle sensor 10 which detects the crankshaft angle of the engine 1 and the top dead center (TDC) of the piston of the first cylinder 1a through the angular position of the distributor, an ignition switch 11, a starting motor 12 and a fuel injection control circuit 13. The fuel injection control circuit 13 comprises an interface 14, a CPU (central processing unit) 15 and a memory 16. In the memory 16, are stored a program for operation of the CPU 15 the flow chart of which is shown in FIG. 3, and the like.

Figure 1:
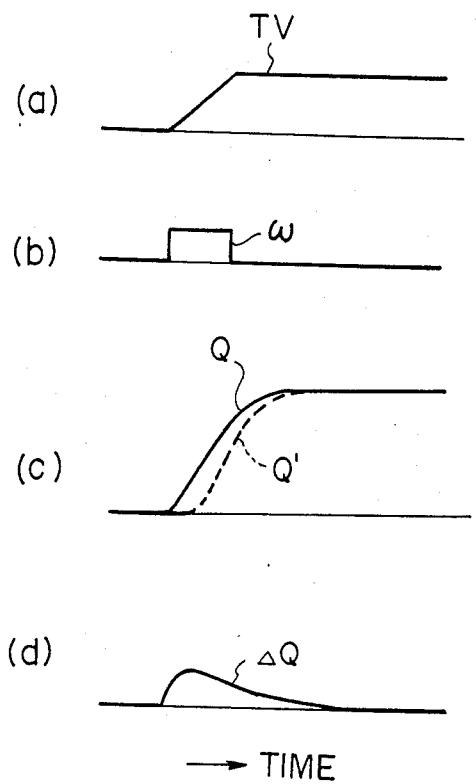
FIG. 1-$a$ is a view illustrating the change with time of the throttle opening degree, FIG. 1-$b$ is a view illustrating the change with time of the angular velocity of the throttle valve, FIG. 1-$c$ is a view illustrating the change with time of the amount of intake air and the change with time of the output of the airflow sensor, FIG. 1-$d$ is a view illustrating the change with time of the amount of fuel by which the amount of fuel to be fed to the cylinders is to be increased.
Figure 4:
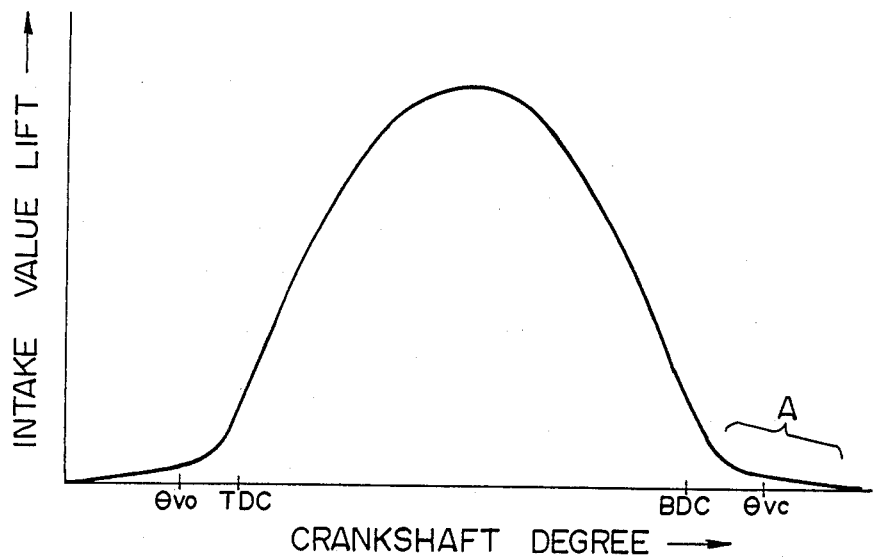
FIG. 4 is a graph showing the relation between the intake valve lift and the timing of opening and closure of the intake valve.

The CPU 15 delivers a startup injection pulse to the fuel injection valve 6 upon startup of the engine 1 so that a predetermined amount of fuel suitable for starting the engine 1 is injected therefrom. After the engine 1 is started, the CPU 15 calculates a fundamental fuel injection amount according to the operating condition of the engine 1, and determines an injection starting crankshaft angle at which fuel injection is to be started according to the fundamental fuel injection amount and a predetermined injection termination crankshaft angle at which fuel injection is to be terminated and which substantially corresponds to the timing of full closure of the intake valve, and delivers the fuel injection pulse to the fuel injection valve 6, thereby feeding fuel to the cylinder substantially in the latter half of the intake stroke. When the engine 1 is to be accelerated, the CPU 15 determines a fuel increasing amount (by which the amount of fuel to be injected is to be increased) according to the acceleration rate and corrects the fundamental fuel injection amount by the fuel increasing amount, the fuel increasing amount being determined separately for each cylinder. The term "the latter half of the intake stroke" means the period from the crankshaft angle at which the intake valve lift is maximized to the crankshaft angle at which the intake valve is fully closed. Further, said timing of full closure of the intake valve, that is, the intake valve full closure crankshaft angle indicated at $\theta vc$ in FIG. 4, may be set at a crankshaft angle at which blow-back of intake gas does not occur at a reference engine speed, for instance, 3000 rpm at which the output of the engine 1 is maximized. For example, the intake valve full closure crankshaft angle $\theta vc$ may be an early crankshaft angle in the ramp (indicated at A in FIG. 4 showing the valve lift characteristics of the intake valve) of the end of the intake stroke.

Now the operation of the engine 1 will be described with reference to FIGS. 3, 3A, 3B and 3C.

In step 1, a flag i on the number of cylinders as numbered in the firing order is initialed as i=1 and j=0. In step 2, the CPU 15 reads a startup signal from the ignition switch 11 and stores it in a register S. In step 3, the CPU 15 determines whether or not the engine 1 is being started by way of the startup signal stored in the register S, i.e., by whether or not the starting motor is energized. When the starting motor is energized, the CPU 15 proceeds to step 4. The CPU 15 stores a predetermined startup injection amount $\beta 0$ in a register I in the step 4, and generates a startup injection pulse corresponding to the valve of the register I. The startup injection pulse is delivered to the fuel injection valve 6 of the cylinder to be fed with fuel which is determined by way of the TDC signal of the first cylinder 1a (step 5). Then the CPU 15 returns to the step 2.

When it is determined that the starting motor is not energized in the step 3, the CPU 15 proceeds to step 6. In the step 6, the CPU 15 determines a fundamental fuel injection amount Ii for the cylinder to be fed with fuel on the basis of the newest amount of intake air B and the newest engine speed R inputted by first and third interrupt routines as shown in FIGS. 3A and 3C respectively and stores it in a register Ii. The first interrupt routine is accomplished every 5ms and in the first interrupt routine the output of the airflow sensor is read and stored in a register B. The third interrupt routine C is accomplished at each predetermined crankshaft angle and in the third interrupt routine, the engine speed is calculated by way of the crankshaft angle signal and is stored in a register R. In step 7, it is determined whether or not the flag j is zero. When the flag j is not zero, the CPU 15 proceeds to step 15 with the flag j being set as J=j−1 in step 14. When it is determined that the flag j is zero in the step 7, the CPU 15 proceeds to step 8. In the step 8, whether or not acceleration is started is determined. When it is determined that acceleration is not started in the step 8, the CPU 15 proceeds to step 16 via step 9 to inject fuel by the fundamental fuel injection amount Ii without correction. When it is determined that acceleration is started in the step 8, the CPU 15 detects the acceleration rate on the basis of the memory of a register Vn input from the second interrupt routine as shown in FIG. 3B and stores it in a register A. The second interrupt routine is accomplished every 20 ms, and in the second interrupt routine, the throttle valve opening degree at that flow and the throttle valve opening degree at the immediately preceding flow are stored in the register Vn. The throttle opening degrees stored in the register Vn are used for calculating the rate of change in the throttle opening degree, thereby calculating the acceleration rate. In step 11, the acceleration flag j is set as J=3 in order to increase fuel only for the first one revolution of the crankshaft from start of the acceleration. In step 12, the increasing amount $\Delta I$ of fuel (by which the amount of fuel to be injected is increased) is determined according to the values of the registers R, B and A. Then in step 13, the increasing amount $\Delta I$ is distributed to the first to fourth cylinders as numbered in the firing order from the start of the acceleration. That is, the increasing amount $\Delta Ii$ of fuel by which the amount of fuel to be fed to each cylinder is to be increased is determined for each cylinder. Then the fundamental fuel injection amount is corrected by the increasing amount Ii ($Ii'=Ii+\Delta Ii$) in step 15.

Then the CPU 15 determines a fuel injection starting crankshaft angle (step 16) and stays at step 17 until the fuel injection starting crankshaft angle. When the fuel injection starting crankshaft angle comes, the CPU 15 causes the injection valve 6 corresponding to the first cylinder to start injection by the corrected amount $Ii'$. When the fuel injection for the first cylinder is terminated, the CPU 15 adds 1 to i, and determines whether or not the value of i reaches 5. (step 19–22) When it is determined that the value of i reaches 5, that is, fuel injection for the fourth cylinder has been accomplished, the CPU 15 sets the value of i at 1 (i=1) in step 23 and returns to the step 2. When it is determined that the value of i is smaller than 5 in the step 22, the CPU 15 directly returns to the step 2.

Though in the above embodiment, so-called stratified charge is accomplished, the present invention can be applied to any other internal combustion engine having a separate intake passage and fuel injection valve for each cylinder.

We claim:

1. A fuel injection system for an internal combustion engine having a plurality of cylinders, a plurality of separate intake passages for the respective cylinder, and a plurality of fuel injection valves respectively disposed in the intake passages for injecting fuel into the corresponding cylinders, the fuel injection system comprising an airflow sensor for detecting the amount of intake air, acceleration detecting means for detecting acceleration of the engine, engine speed detecting means for detecting the rpm of the engine, a fundemental fuel injection amount determining means for determining a fundamental amount of fuel to be injected for each cylinder according to the outputs of the airflow sensor and the engine speed detecting means, fuel injection amount correcting means for increasing said fundamental amount of fuel when the engine is to be accelerated according to the output of the acceleration detecting means, the fuel injection amount correcting means increasing the fundamental amount of fuel by an increasing amount which differs from cylinder to cylinder taking into account the difference between the actual amount of intake air and output of the airflow sensor, said fuel injection amount correcting means having means for detecting the cylinder whose amount of fuel is to be first increased after acceleration of the engine is detected and said fuel injection amount correcting means gradually increasing, in the firing order, the increasing amount for a predetermined number of cylinders as numbered from said cylinder whose amount of fuel is to be first increased after acceleration of the engine is detected, and then gradually reducing the same for the cylinders to be ignited thereafter, and fuel feeding means for injecting fuel from the injection valve by said fundamental amount when the engine is not to be accelerated and by said fundamental amount increased by said increasing amount when the engine is to be accelerated.

2. A fuel injection system for an internal combustion engine having a plurality of cylinders, a plurality of separate intake passages for the respective cylinder, and a plurality of fuel injection valves respectively disposed in the intake passages for injecting fuel into the corresponding cylinders, the fuel injection system comprising a airflow sensor for detecting the amount of intake air, acceleration detecting means for detecting acceleration of the engine, engine speed detecting means for detecting the rpm of the engine, a fundamental fuel injection amount determining means for determining a fundamental amount of fuel to be injected for each cylinder according to the outputs of the airflow sensor and the engine speed detecting means, fuel injection amount correcting means for increasing said fundamental amount of fuel when the engine is to be accelerated according to the output of the acceleration detecting means, the fuel injection amount correcting means increasing the fundamental amount of fuel by an increasing amount which differs from cylinder to cylinder taking into account the difference between the actual amount of intake air and output of the airflow sensor, said fuel injection amount correcting means having means for detecting the cylinder whose amount of fuel is to be first increased after acceleration of the engine is detected and said fuel injection amount correcting means gradually reducing, in the firing order, the increasing amount for the cylinders from the cylinder whose amount of fuel is to be first increased after the acceleration of the engine is detected, and fuel feeding means for injecting fuel from the injection valve by said fundamental amount when the engine is not to be accelerated and by said fundamental amount increased by said increasing amount when the engine is to be accelerated.

3. A fuel injection system for an internal combustion engine having a plurality of cylinders, a plurality of separate intake passages for the respective cylinder, and a plurality of fuel injection valves respectively disposed in the intake passages for injecting fuel into the corresponding cylinders, the fuel injection system comprising an airflow sensor for detecting the amount of intake air, acceleration detecting means for detecting acceleration of the engine, engine speed detecting means for the rpm of the engine, a fundamental fuel injection amount determining means for determining a fundamental amount of fuel to be injected for each cylinder according to the outputs of the airflow sensor and the engine speed detecting means, fuel injection amount correcting means for increasing said fundamental amount of fuel when the engine is to be accelerated according to the output of the acceleration detecting means, the fuel injection amount correcting means increasing the fundamental amount of fuel by an increasing amount which differs from cylinder to cylinder taking into account the difference between the actual amount of intake air and output of the airflow sensor, said fuel injection amount correcting means having means for detecting the cylinder whose amount of fuel is to be first increased after acceleration of the engine is detected and said fuel injection amount correcting means gradually reducing, in the firing order, the increasing amount for the cylinders from the cylinder from which said fundamental amount of fuel is started to be increased, and fuel feeding means for injecting fuel from the injection valve by said fundamental amount when the engine is not to be accelerated and by said fundamental amount increased by said increasing amount when the engine is to be accelerated.

4. A fuel injection system for an internal combustion engine having a plurality of cylinders, a plurality of separate intake passages for the respective cylinder, and a plurality of fuel injection valves respectively disposed in the intake passages for injecting fuel into the corresponding cylinders, the fuel injection system comprising an airflow sensor for detecting the amount of intake air, acceleration detecting means for detecting acceleration of the engine, engine speed detecting means for detecting the rpm of the engine, a fundamental fuel injection amount determining means for determining a fundamental amount of fuel to be injected for each cylinder according to the outputs of the airflow sensor and the engine speed detecting means, fuel injection amount correcting means for increasing said fundamental amount of fuel when the engine is to accelerated according to the output of the acceleration detecting means, the fuel injection amount correcting means increasing the fundamental amount of fuel by an increasing amount which differs from cylinder to cylinder taking into account the difference between the actual amount of intake air and output of the airflow sensor, fuel injection timing means for each cylinder set differently so that the cyclinders are sequentailly injected with fuel, and fuel feeding means for injecting fuel from the injection valve by said fundamental amount when the engine is not to be accelerated and by said fundamental amount increased by said increasing amount when the engine is to accelerated, said increasing amount being gradually reduced in the order of the fuel injection order.

5. A fuel injection system as defined in claim 4 in which, during a predetermined period after the acceleration of the engine is detected, the increasing amount of fuel for the cylinders is increased by said fuel injection amount correcting means in the order of the fuel injection order.

6. A fuel injection system as defined in claim 4 including means whereby fuel injection timing for each cylinder is in synchronization with an intake stroke of the corresponding cylinder.

7. A fuel injection system as defined in claim 4 in which said fuel injection amount correcting means gradually reduces, in the firing order, the increasing amount for the cylinders from the cylinder whose amount of fuel is to be first increased after the acceleration of the engine is detected.

8. A fuel injection system as defined in claim 7 including means whereby fuel injection timing for each cylinder is in synchronization with the corresponding cylinder.

9. A fuel injection system as defined in claim 4 in which said acceleration detecting means comprises a throttle opening degree sensor for detecting the opening degree of the throttle valve, and outputs a value depending upon the rate of change in the opening degree of the throttle valve.

* * * * *